(12) United States Patent
Stangl

(10) Patent No.: US 11,807,270 B2
(45) Date of Patent: Nov. 7, 2023

(54) STATE ESTIMATOR

(71) Applicant: Arriver Software AB, Linköping (SE)

(72) Inventor: Armin Stangl, Maisach (DE)

(73) Assignee: Arriver Software AB, San Diego, CA (US)

( * ) Notice: Subject to any disclaimer, the term of this patent is extended or adjusted under 35 U.S.C. 154(b) by 447 days.

(21) Appl. No.: 16/956,148

(22) PCT Filed: Nov. 22, 2018

(86) PCT No.: PCT/EP2018/082261
§ 371 (c)(1),
(2) Date: Jun. 19, 2020

(87) PCT Pub. No.: WO2019/120861
PCT Pub. Date: Jun. 27, 2019

(65) Prior Publication Data
US 2020/0339154 A1 Oct. 29, 2020

(30) Foreign Application Priority Data
Dec. 19, 2017 (EP) .................................... 17208647

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
None
See application file for complete search history.

(56) References Cited

U.S. PATENT DOCUMENTS 7,308,432 B2 * 12/2007 Torii ...................... G05B 17/02
701/25
8,509,523 B2 8/2013 Schamp et al.
(Continued)

FOREIGN PATENT DOCUMENTS

| JP | 2008507454 A | 3/2008 |
|----|--------------|--------|
| JP | 2017154725 A | 9/2017 |
| WO | 2016/145547 A1 | 9/2016 |

OTHER PUBLICATIONS

Kim et al., "Prediction of Driver's Intention of Lane Change by Augmenting Sensor Information Using Machine Learning Techniques", Jun. 10, 2017, sensors, pp. 1-18 (Year: 2017).*
International Search Report of PCT/EP2018/082261, dated Feb. 12, 2019.
Kim, Byeoungdo, et al., "Probabilistic vehicle trajectory prediction over occupancy grid map via recurrent neural network", 2017 IEEE 20th International Conference on Intelligent Transportation Systems (ITSC), IEEE, Oct. 16, 2017 (Oct. 16, 2017), pp. 399-404, XP033330586, DOI: 10.1109/ITSC.2017.8317943.
(Continued)

*Primary Examiner* — Tamara L Weber
(74) *Attorney, Agent, or Firm* — Arriver Software AB

(57) ABSTRACT

An apparatus for a motor vehicle driver assistance system for an ego vehicle is provided. The apparatus implements a state estimator configured to use a first state of the ego vehicle to calculate a subsequent second state of the ego vehicle, wherein calculating the second state from the first state includes a prediction element and an update element, wherein calculating the second state from the first state includes using an artificial neural network ("ANN").

15 Claims, 11 Drawing Sheets

(51) Int. Cl.
    *B60W 30/095*    (2012.01)
    *B60W 40/10*     (2012.01)
    *G05D 1/00*      (2006.01)
    *G05D 1/02*      (2020.01)
    *G08G 1/16*      (2006.01)
    *G06N 3/045*     (2023.01)

(52) U.S. Cl.
    CPC ........ *B60W 40/10* (2013.01); *B60W 60/0027* (2020.02); *G05D 1/0088* (2013.01); *G05D 1/0221* (2013.01); *G06N 3/045* (2023.01); *G08G 1/166* (2013.01); *G05D 2201/0213* (2013.01)

(56) References Cited

U.S. PATENT DOCUMENTS

| | | |
|---|---|---|
| 8,594,370 B2 | 11/2013 | Schamp et al. |
| 9,330,321 B2 | 5/2016 | Schamp et al. |
| 10,759,446 B2 | 9/2020 | Motomura et al. |
| 2009/0010495 A1 | 1/2009 | Schamp et al. |
| 2012/0045119 A1 | 2/2012 | Schamp et al. |
| 2014/0037145 A1 | 2/2014 | Schamp et al. |
| 2014/0044310 A1 | 2/2014 | Schamp et al. |
| 2017/0286826 A1 | 10/2017 | Min et al. |
| 2018/0105186 A1 | 4/2018 | Motomura et al. |
| 2019/0101917 A1* | 4/2019 | Yao ........................ B60W 50/14 |
| 2020/0180609 A1* | 6/2020 | Dieckmann ........... B60W 50/14 |
| 2020/0349362 A1* | 11/2020 | Maloney ................... G01S 5/16 |

OTHER PUBLICATIONS

Khosroshahi, Aida, et al., "Surround vehicles trajectory analysis with recurrent neural networks", 2016 IEEE 19th International Conference on Intelligent Transportation Systems (ITSC), IEEE, Nov. 1, 2016 (Nov. 1, 2016), pp. 2267-2272, XP033028653, DOI: 10.1109/ITSC.2016.7795922, pp. 2267-2270.

Mitrovic, Dejan, "Short term prediction of vehicle movements by neural networks", Knowledge-Based Intelligent Information Engineering Systems, 1999. Thi Rd. International Conference Adelaide, SA, Australia, Aug. 31-Sep. 1, 1999, Piscataway, NJ, USA, IEEE, US Aug. 31, 1999 (Aug. 31, 1999), pp. 187-190, Abstract, only.

Se-Young, Oh, et al., "Modeling of Vehicle Dynamics From Real Vehicle Measurements Using a Neural Network With Two-Stage Hybrid Learning for Accurate Long-Term Prediction", Computational Intelligence in Robotics and Automation, 1999. CIRA '99. Proceedings. 1999 IEEE International Symposium on Monterey, CA, USA Nov. 8-9, 1999, Piscataway, NJ, USA, IEEE, US, Nov. 8, 1999 (Nov. 8, 1999), pp. 83-88, XP010365353, DOI: 10.1109/CIRA. 1999.809951, ISBN: 978-0-7803-5806-5, pp. 83-88, Abstract, only.

Japanese Patent Application No. 2020-528883 First Office Action dated Jun. 25, 2021.

English Translation of Japanese Patent Application No. 2020-528883 First Office Action dated Jun. 25, 2021.

European Search Report—17208647—Search Authority—The Hague—dated Jun. 13, 2018.

\* cited by examiner

STATE ESTIMATOR

CROSS-REFERENCE TO RELATED APPLICATIONS

This application is a 35 U.S.C. § 371 national phase of PCT International Application No. PCT/EP2018/082261, filed Nov. 22, 2018, which claims the benefit of priority under 35 U.S.C. § 119 to European Patent Application No. 17208647.2, filed Dec. 19, 2017, the contents of which are incorporated herein by reference in their entirety.

FIELD OF THE INVENTION

The present invention relates to a motor vehicle driver assistance system for an ego vehicle, and more particularly an apparatus for estimating the state of an ego vehicle.

In order that accidents are avoided and driving laws are complied with, driving a vehicle requires concentration from the driver, often for prolonged periods. Lapses in concentration from the driver lead to increased risk of accidents and/or non-compliance with the law. Increasingly, driver assistance systems that are capable of performing an assistance function are fitted to the driver's vehicle (hereinafter referred to as the "ego vehicle"). For example, the assistance function may comprise relieving the driver of some of his/her driving duties, or may comprise monitoring the driver's performance in order that errors may be anticipated and/or avoided.

Alternatively, the assistance function may introduce some additional functionality not ordinarily available to a driver. Such additional functionality may allow the driver to have more information than they ordinarily would, in order that they can perform a driving task more easily. A rear-facing camera for example, which can provide a video feed to a driver when reversing, constitutes an example of such an additional functionality. In this example, the video feed allows the driver to reverse-park more easily and safely but is not actually necessarily monitoring the driver's performance or performing some task for them.

Driver assistance systems therefore mitigate risk for the driver of the ego vehicle, his/her passengers, and other road users. Ultimately, driver assistance functions will be developed to such an extent that they can control most or all aspects of driving an ego vehicle. In this case, the driver assistance system will be an autonomous driving system.

Driver assistance systems may include active devices, which are capable of actively intervening in the operation of the ego vehicle, for example by changing the speed of the ego vehicle. Driver assistance systems may alternatively, or additionally include passive devices, which notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor measures parameters of the vehicle and/or its surroundings. The data from such a sensor is processed in order to draw conclusions based on the sensor measurements. The driver assistance system may then trigger an interaction with the ego vehicle, or with the driver, based on the result of the conclusions. In the case of an autonomous driving system, substantially all driving functions are controlled by the system.

Examples of potential sensors used in driver assistance systems and autonomous driving systems include RADAR systems, LIDAR systems, cameras or camera, inter-vehicle communications, and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. Such a sensor is able to determine the distance to the vehicle ahead. The driver assistance system also knows, and can control, the velocity of the ego vehicle. The driver assistance system may control the speed of the ego vehicle in order to maintain a predefined safety condition relative to the vehicle ahead. For example, the driver assistance system may control the speed to maintain a certain distance between the ego vehicle and the vehicle ahead. Alternatively, the driver assistance system may control the speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the user of potential hazards. For example the driver may be notified about the ego vehicle changing lanes when a second vehicle is in a blind spot, or detecting a second vehicle cutting-in to the path of the ego vehicle. The situational awareness may also be used as an input to an ACC system, for example.

Providing a detailed and reliable situational awareness is important for a number of different driver assistance functionalities.

In general, an ego vehicle may be fitted with a number of different sensors and sensor systems, which are part of a driver assistance system. Each sensor/sensor system may provide information in a different form. The information may be in the form of raw measurements, or in the form of data/information that has been processed to a greater or lesser extent. The information from the sensors may also have an associated uncertainty.

A driver assistance system needs to maintain a situational awareness about the current real-world situation of the ego vehicle. The situation of the ego vehicle may include various categories of information: ego vehicle information (e.g. location, speed, heading, etc.), the surrounding environment information (e.g. position of lane markings, road signs, geographical markers, landmarks etc.), and/or local object(s) information (e.g. position and velocity of local vehicle(s)).

A mathematical representation of this real world situation is referred to as the "state" of the ego vehicle. The state describes everything known about the ego vehicle at a single point in time. As an example, the state may be a vector of numbers, x, and the variances or covariances of the vector of numbers, together forming an x, P tuple. The state of an ego vehicle may include some or all of the above categories of information. The state therefore effectively constitutes a representation of a situation awareness of an ego vehicle. It will be appreciated that the information in the state, and what real-world elements that information corresponds to, may change with time. For example, if there are no local objects, then there will not be any information regarding local objects in the state of the ego vehicle. If a local object is subsequently detected by the driver assistance system, then information regarding that local object may then be incorporated into the state.

A state of an ego vehicle may be used as an input to a number of driver assistance functionalities. These may be Advanced Driver assistance systems (ADAS). These downstream driving aids may be safety critical, and/or may give the driver of the vehicle information and/or actually control the vehicle in some way. Accordingly, it is important that the state is as accurate and robust as possible. The state may also be used in an automated driving system.

In terms of accuracy of the state, it is important to exploit to the maximum extent possible the available information in order to improve the accuracy of the state. In that way, the state may be a more reliable reflection of the real world situation of the ego vehicle. The available information may include sensor data, which may correspond to measurements of the state or elements of the state.

In terms of robustness, sensor measurements are often inherently noisy; that is, the raw measurement provided by the sensor, or parameter calculated using the raw sensor measurement, has an associated uncertainty. The uncertainty may be systematic (for example, a mounting position of the sensor that is not exactly as predicted by the vehicle specifications) and/or the uncertainty may be random (for example, a GPS receiver has a fundamental limit on the accuracy of position that can be calculated). In an advanced driving system, both of these sources of uncertainty in the sensor measurements may be unavoidable, or irreducible beyond a certain minimum. Since the state may be used in safety-critical driving aids, it is clearly of paramount importance that the state is robust and the information contained therein is a reliable reflection of the real-world situation. A state that is robust to changes in the uncertainties, and/or to large uncertainties, is part of fulfilling this requirement.

A state of an ego vehicle may contain information describing a number of categories of information. Much of this information contained in the state may be interrelated.

It will also be appreciated that, in general, number of measurements from sensors on an ego vehicle and/or their corresponding uncertainties may be variable. For example, the weather may affect the availability and/or accuracy of data from sensors. For example, some sensors' performance may deteriorate in rain conditions. The performance of some sensors may vary systematically; for example, some sensors may be affected by changes in temperature. Uncertainty in the sensor measurement(s) may be reflected in uncertainty in the state.

Regardless of the causes of the uncertainties in the state, it is desirable to maintain a robust state of an ego vehicle that accurately reflects the real-world situation across a broad range of conditions and sensor qualities.

A real-world situation for an ego vehicle is, in general, dynamic. That is, from one time step to the next, motion is generally taking place. This may be motion of the ego vehicle itself or motion of other local objects near the ego vehicle, or of a combination of the two motion types. Because the real-world situation is dynamic, a state describing that real world situation should be able to reflect, predict and describe that dynamism.

SUMMARY AND INTRODUCTORY DESCRIPTION OF EMBODIMENTS OF THE INVENTION

It is an object of the invention to provide an improved apparatus for a driver assistance system and method of operating an apparatus for a driver assistance system, which seeks to address some or all of these issues.

According to a first aspect of the present invention, there is provided an apparatus for a motor vehicle driver assistance system for an ego vehicle, the apparatus being configured to: implement a state estimator configured to use a first state of the ego vehicle to calculate a subsequent second state of the ego vehicle, wherein calculating the second state from the first state includes a prediction element and an update element, wherein: the prediction element includes using a prediction model to estimate the second state from the first state; the update element includes using an update model to refine the estimated second state, wherein the update model refines the estimated second state on the basis of at least one value corresponding to a measurement of the second state, the at least one value being determined from a sensor measurement, and; wherein calculating the second state from the first state includes using an artificial neural network ("ANN").

Advantageously, the ANN is part of one or both of the prediction model and the update model.

Conveniently, the prediction model is a prediction ANN, wherein an input vector to the prediction ANN is formed from at least a portion of the first state and; an output vector of the prediction model ANN is at least a portion of the estimated second state.

Preferably, the update model is an update ANN, and wherein an input vector to the update ANN is formed from at least a portion of the estimated second state and the at least one value corresponding to a measurement of the second state, and; an output vector of the update ANN is at least a portion of the second state.

Advantageously, the update model and the prediction model are combined into a combined ANN, and wherein an input vector to the combined ANN is formed from at least a portion of the first state and the at least one value determined from a sensor measurement, and; an output vector of the combined ANN forms at least a portion of the second state.

Conveniently, the first state and the second state each include at least one ego vehicle attribute describing an aspect of a motion of the ego vehicle.

Preferably, the first state and the second state each include at least one local object attribute describing an object located in the vicinity of the ego vehicle.

Advantageously, the at least one local object attribute includes a location of the local object.

Conveniently, the prediction element is configured to estimate a second location of the local object in the estimated second state using a first location of the local object in the first state.

Preferably, the local object is a local vehicle.

Advantageously, the at least one value corresponding to a measurement of the second state includes a measurement of the second location of the local vehicle.

Conveniently, the apparatus is configured to output an output variable from the second state for use by an active driver assistance device or a passive driver assistance device.

Preferably, the apparatus is configured to output an output variable from the second state for presentation to a driver of the ego vehicle.

Advantageously, the first state and the second state each include at least one environment attribute describing an environment in which the ego vehicle is located.

According to a second aspect of the present invention, there is provided a method for estimating a state of an ego vehicle, the state being for use in a motor vehicle driver assistance system for the ego vehicle, the method including the steps of: using a state estimator to use a first state of the ego vehicle to calculate a subsequent second state of the ego vehicle, wherein calculating the second state from the first state includes a prediction element and an update element, wherein: the prediction element includes using a prediction model to estimate the second state from the first state; the update element includes using an update model to refine the estimated second state, wherein the update model refines the estimated second state on the basis of at least one value corresponding to a measurement of the second state, the at least one value being determined from a sensor measurement, and; wherein calculating the second state from the first state includes using an artificial neural network ("ANN").

Of course, the features recited in respect of each particular aspect may be readily applied to the other aspects.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
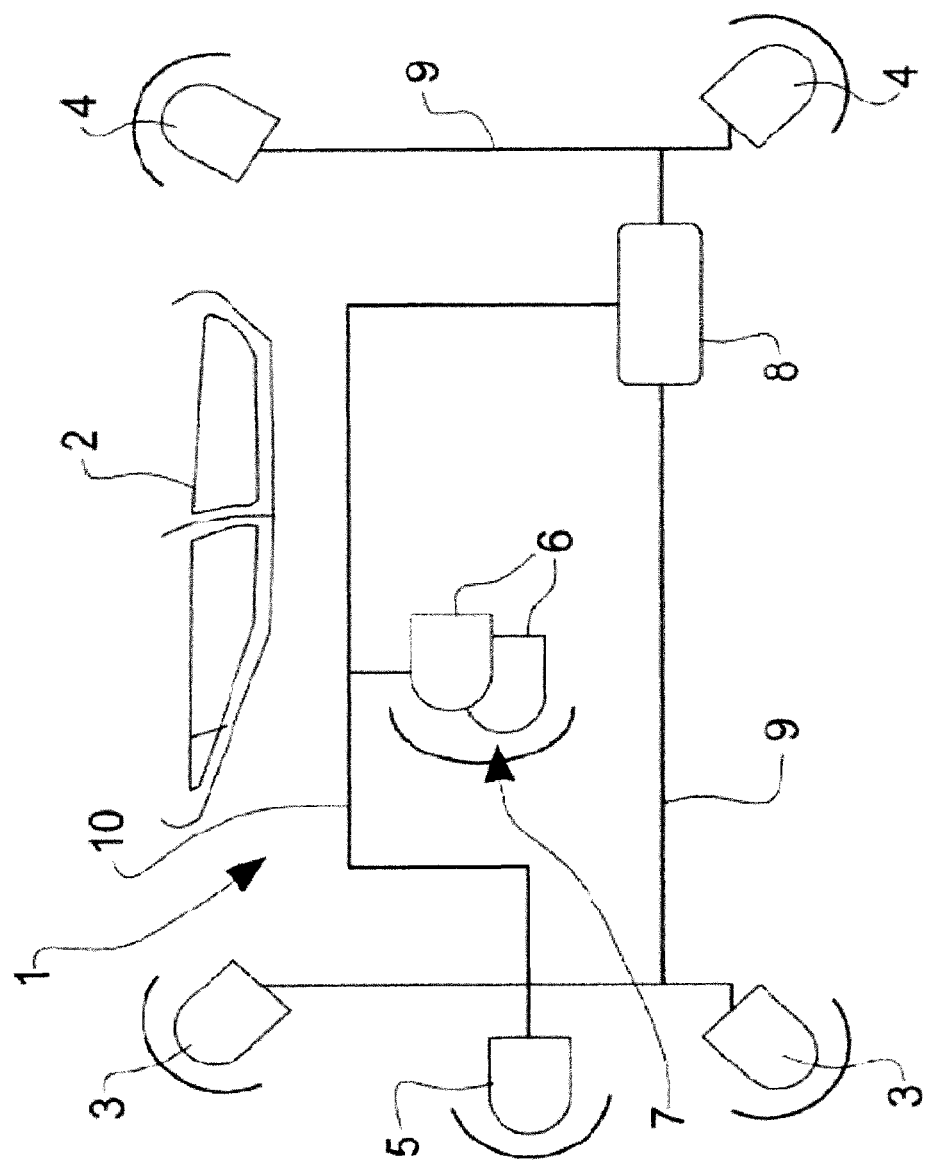
FIG. 1 is a schematic view of an ego vehicle including a system according the present invention.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The driver assistance system 1 comprises a number of different types of sensor mounted at appropriate positions on the ego vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 (cameras) forming part of a stereo vision system ("SVS") 7 which may be mounted, for example, in the region of the upper edge of the vehicle's windscreen. The various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the ECU 8 via a conventional Controller Area Network ("CAN") bus 9, and the LRR sensor 5 and the sensors of the SVS 7 are connected to the ECU 8 via a faster FlexRay serial bus 10, also of a type known per se.

Collectively, and under the control of the ECU 8, the various sensors 3-6 can be used to provide a variety of different types of driver assistance functionalities such as, for example: blind spot monitoring; adaptive cruise control; collision prevention assist; lane departure protection; and rear collision mitigation. Similar sensors may be used in an autonomous driving system.

It is noted that the CAN bus 9 may be treated by the ECU as a sensor that provides ego vehicle parameters to the ECU. A GPS module may also be connected to the ECU as a sensor, providing geolocation parameters to the ECU.

The driver assistance system 1 implements a state estimator and an Artificial Neural Network (hereby "ANN") for using a first state of the ego vehicle in order to estimate a subsequent second state of the ego vehicle. The ECU 8 may be configured to implement the state estimator.

The state of the ego vehicle, or a component of it, may be used by a driver assistance system/function or ADAS system or autonomous driving system/function, for example. Additionally or alternatively, the state of the ego vehicle, or a component of it, may be output for presentation to a driver of the ego vehicle (for example, display on a screen or audibly notified to the driver). The state may include parameters, or allow parameters to be derived therefrom, that can be used by the ADAS/autonomous driving systems on the ego vehicle. For the ego vehicle, state estimation may include environment parameter and vehicle parameter estimation, e.g. tracking target vehicle kinematics, ego vehicle motion, lane and road geometries or Free Space.

Instead of calculating a state for each time step using only the data that is coming from the sensors on a vehicle, a persistent state can be maintained within the driver assistance system. The persistent state is maintained during each of a series of time steps or operating cycles, by a state estimator. The maintenance of the persistent state by the state estimator may be a generally continuous process. The goal of state estimation is to find accurate numbers for a system's current state space values by means of filtering noisy and inaccurate measurements over time. This is achieved by a state estimator, for example a Kalman filter.

In driver assistance systems, state estimation occurs mostly in environment and ego vehicle state estimation, e.g. when tracking target vehicle kinematics, ego motion, Lane and road geometries or Free Space. These may be highly non-linear problems.

In general, state estimators usually store persistent state estimate values over time. In an alternating fashion, the state estimator first predicts the trajectory of a first state through state space using an algebraic model and then updates this prediction using measurements taken by a sensing device. The measurements are usually discarded after they have been used once, so that the whole information extracted by the state estimator is stored within the state. This effective compression may introduce a signal latency but effectively results in a trajectory smoothing; a desirable property of the state estimator.

Figure 2:
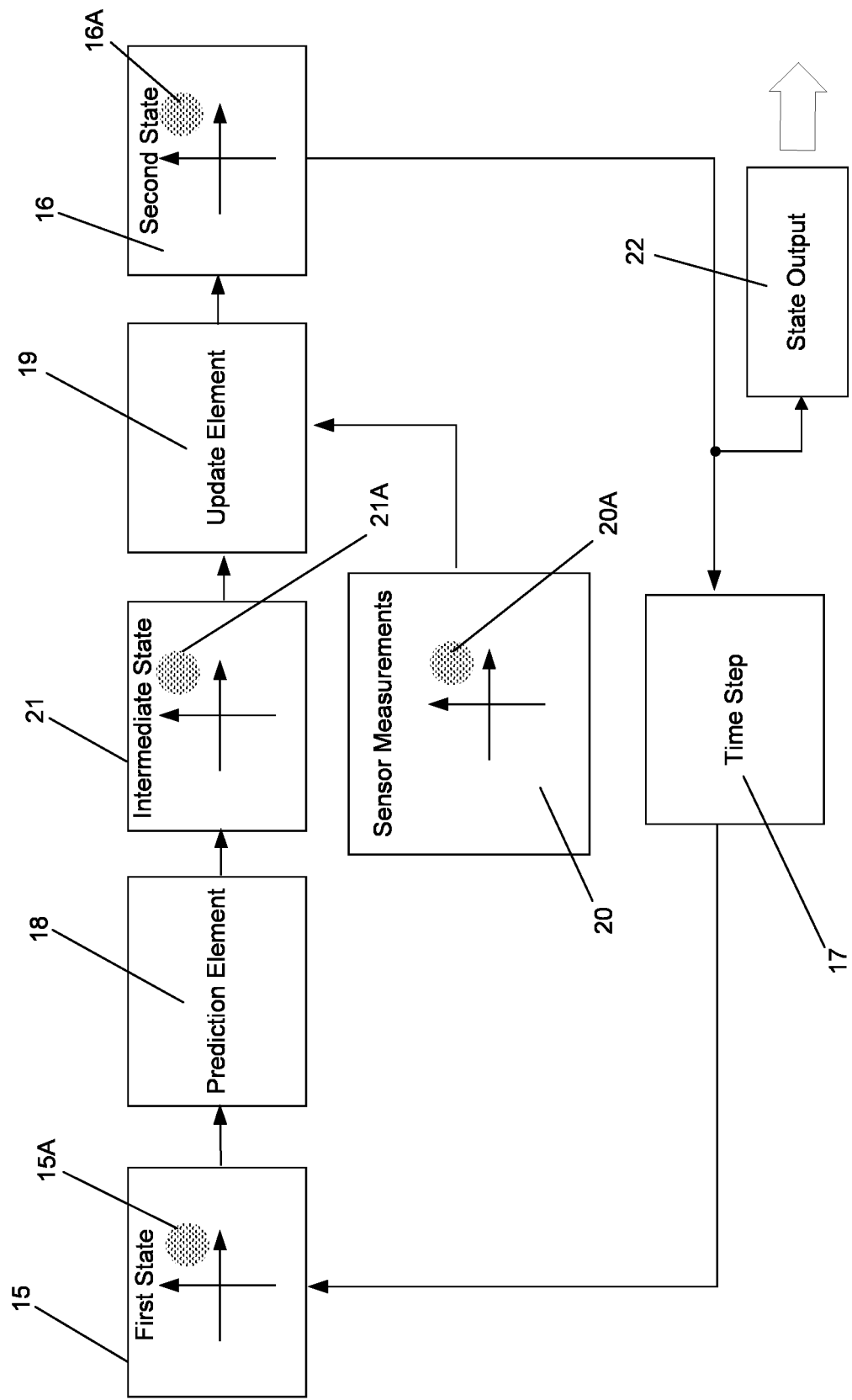
FIG. 2 is a block diagram illustrating a Kalman filter state estimator.

FIG. 2 illustrates the principles of a Kalman filter state estimator. The prior knowledge of the state corresponds to a first state 15. In the x, P tuple regime, the first state is $\hat{x}_{k-1|k-1}$, $\overline{P}_{k-1|k-1}$. The first state 15 is also illustrated schematically in a first state plot 15A in state space, so the axes of the first state plot correspond to the variables comprised in the first state 15. By way of example, the first state 15 and consequently the first state plot 15A are two-dimensional. In general, however, the ego vehicle state may have a higher dimensionality. Hundreds to thousands of dimensions may be considered typical for an ego vehicle state. Multiple (decoupled) filters may be implemented to cover a large number of dimensions. Nevertheless, the principles illustrated in FIG. 2 and described here are applicable to ego vehicle states.

The "output estimate of the state" corresponds to a subsequent, second state 16, to the first state 15, and is shown in a second state plot 16A. In the x, P tuple regime, the first state is $\hat{x}_{k-1|k-1}$, $\overline{P}_{k-1|k-1}$. It will be appreciated the second state 16 becomes the first state in the next time step 17, in which k→k−1.

The aim and purpose of the state estimator is to calculate the second state 16 from the first state 15. Repeated first to second state calculations may be considered as the maintenance of a persistent state.

There are two elements to the calculation of the second state 16 from the first state 15. The first element is a prediction element 18. The second element is an update element 19.

The prediction element 18 includes a prediction model. This prediction model generally describes the trajectory of the first state 15 through state space for the time that has elapsed between the first state 15 and the second state 16. The prediction model mathematically describes how to implement a time-step on the first state 15 to estimate the second state 16.

For example, an object located near the ego vehicle may be detected by sensors on the ego vehicle. Parameters describing this detected object may be included in the first state. A prediction model for that object predicts how the object may move in the next time step and consequently how the object should be described in the second state. What the object actually is in the real world may determine the physical model that is most applicable. For example, if the object is another vehicle, then a "coordinated turn model" may be the most appropriate model. The coordinated turn model is used to describe the path of vehicles moving along a circular line. Alternatively, for example, if the object is a pedestrian, then a constant acceleration model may be more appropriate. If the type of the detected object has not been determined (for example whether the object is a vehicle or a pedestrian), then the most appropriate prediction model may also be as-yet undetermined.

The update element 19 includes an update model. This update model generally describes how sensor measurements 20 of the second state 16 are incorporated into the second state 16. The measurements 20 are illustrated schematically in a measurement plot 20A. In the x, P tuple regime, the sensor measurements of x are $y_k$. The second state 16 that is refined by the update model is the estimated second state 16 having undergone the prediction made by the prediction model, which may be thought of as intermediate state 21. In the x, P tuple regime, the intermediate state is $\hat{x}_{k-1|k-1}$, $\overline{P}_{k-1|k-1}$. However, the prediction model and the update model may effectively be applied to the first state 15 in one operation or as, in effect, the same equation. There may be no need to explicitly generate an intermediate state 21.

The state x of a vehicle, for example, could be position=(x, y, vx, vy), while the measurement from the sensor could be y=(range, bearing, range_rate), for example.

In general, the prediction element 18 may increase the uncertainty in the state. The update element 19, by incorporating real world measurements into the state, may decrease the uncertainty in the state. Effectively, the real world sensor measurements correspond to a measurement of the second state. Deriving the update model may be an optimization process trading off sensor accuracy and prediction model accuracy.

The current state of the ego vehicle may be read and used in any of a number of different ways in a variety of driver assistance systems. This is signified by a state output 22.

By way of example, if the vehicle is currently located at position x, y, travelling with velocity v, then what is the position x', y' and velocity v' at some later time t=t+dt? The magnitude of the time step, dt, may be different for different time steps. The prediction model estimates the answer to this question. In this simple example, the prediction model may include the equations of motion.

What may generally be received from the sensor is a stream of measurements y. In the same way as there an x, P tuple domain for the internal state, there also is a y, R tuple domain for the sensor measurements in which R is a (mostly unknown) matrix of first order moments. The moments R are often not available from sensors.

However, there may be a measurement made of one or some of x', y'; or v' at t=t+1. This is information that can be incorporated into the intermediate state to improve the accuracy of the second state 16. The measurements 20 of the at least one of the state variables is/are thus incorporated into the intermediate state by the update model in the update element 19. The measurements 20 may not include measurements of all of the variables in the second state 16. The covariances of the variables may not be directly measured. The covariances represent moments of the "belief probability distribution" of the estimation system. The measurements may be non-linear. For example, a radar sensor may measure distance=sqrt(x^2+y^2), instead of x or y directly. Generally the state may be underdetermined or determined by the measurements.

Low values in R indicate high-precision sensors. Low values in Q (prediction model noise) may indicate accurate physical models.

In general, a Kalman filter takes a first state and calculates a second state by a) predicting the second state based on a physical model to form an intermediate state, and b) updating the intermediate state based on measurements of the second state (or parts of it). As above, it will be appreciated that the two steps (prediction and update) may be performed mathematically simultaneously, and no intermediate state may actually be formed explicitly.

A particular state may include both a state vector $\hat{x}_k$ and a covariance matrix $P_k$ of the state vector. In FIG. 2, $\hat{x}_k$ is a state vector, which is vector of numbers that represent a position in state space (the central position of the state). $P_k$ is the covariance matrix of $\hat{x}_k$ and represents the spread of the state around the central position. In other words, the covariance matrix is the first moment of the posterior probability distribution over possible state values given the measurements received so far.

The Kalman filter is designed to find the theoretically exact solution to the state estimation problem under the assumption that all distributions involved are truly Gaussian and all operations are linear and exactly known. For the Kalman filter, both computational steps, prediction and update, are matrix operations on numerical values. All operations are inherently stateless. The only information carried over to the next time step is the Kalman filter state $\hat{x}_k$ and $P_k$, which are assumed to approximate the posterior.

If certain requirements of the noise behaviour of the data are fulfilled by the measurements 20, then, after having been incorporated into the second state 16 in the update element 19, the measurements 20 may be discarded. Effectively, all of the information embodied by the measurements 20 is extracted by the update element and is incorporated in to the second state 20. In the next time step, the second state 16 becomes the first state 15. Thus, the state is effectively maintained as the current state of the ego vehicle system by the state estimator. By maintaining a current state using a state estimator, the storage requirements of a compute module running the state estimator are minimized because the measurements can be discarded after use.

According to the present invention, an ANN is used as part of state estimation for a motor vehicle driver assistance system. Using an ANN may allow for nonlinear models, non-Gaussian belief distributions and unknown or only partly known modelling equations. Missing knowledge about the system is extracted during the training process of the ANN. The trade-off between low latency and high smoothing is automatically made by minimizing any arbitrary error function. Online learning may also be implemented, which may compensate for changes that happen in real-time. Such changes may include, for example, sensor misalignments, sensor failures or degradation, and/or a change in environment.

An ANN is a machine learning technique. In general, an ANN is based upon a plurality of interconnected (in a mathematical sense) computational units (commonly referred to as "neurons"). Generally, the neurons are connected in layers, and signals travel from the first (input) layer, to the last (output) layer. The signals (incoming and outgoing) and the state of each neuron is a real number, typically chosen to be between 0 and 1.

Figure 3:
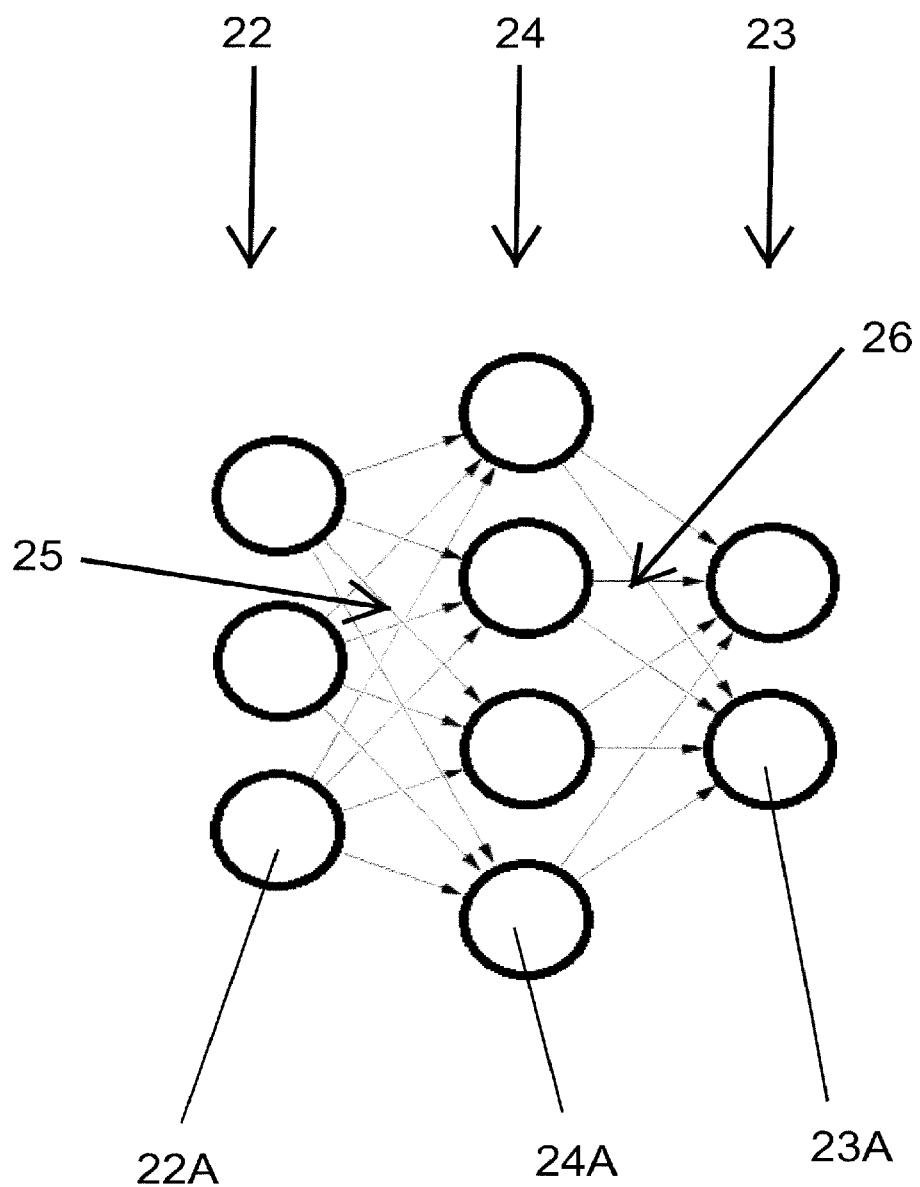
FIG. 3 illustrates an Artificial Neural Network ("ANN")

FIG. 3 illustrates an example of a feedforward artificial neural network (FNN). An FNN is a category of ANN. The FNN includes an input layer 22 and output layer 23. Between the input layer 22 and the output layer 23 is a single hidden layer 24. The input layer 22 includes input neurons 22A; the hidden layer 24 includes hidden neurons 24A, and; the output layer 23 includes output neurons 23A. There are input neural connections 25 between the input neurons 22A and the hidden neurons 24A. There are output neural connections 26 between the hidden neurons 24A and the output neurons 23A. Data flows one way from the input layer 22, through the hidden layer 24, to the output layer 23. In an FNN, the data only flows this way. An FNN (and an ANN, in general) may have more than one hidden layer 23. The input to the input layer may be an input vector. The input vector may be a plurality of values, each respective value in the input vector being used as an input to a corresponding input neuron in the input layer. The output from the output layer may be an output vector. The output vector may be a plurality of output values, each respective output value in the output vector being output from a corresponding output neuron in the output layer. The length of input vector may be different from the length of the output vector. The length of input vector may be equal to the length of the output vector.

In general, each neuron 22A, 23A, 24A calculates the weighted sum of all of its inputs. The weighted sum is used as the argument of an activation function for the respective neuron. The output of the activation function is used as the output of the neuron. The output of the neuron may be fed into one or more downstream (i.e. subsequent layer) neurons through one or more outbound neuron connections.

ANNs have been designed and implemented to solve regression problems. Regression involves estimating a mathematical relationship between variables. For example, regression may correspond to the process of fitting continuous curves onto noisy data; thus estimating the mathematical form of a relationship between the variable as described by the noisy data.

By using ANNs, relationships between variables can be described that are highly nonlinear and may be of arbitrary complexity. The complexity of the relationship that the ANN can describe may be limited by the choice of hyper-parameters of the ANN. The hyper-parameters of an ANN correspond to the descriptors of the ANN itself, rather than the underlying data. For example, the hyper-parameters may include the number of neurons in the ANN and the number of layers into which those neurons are arranged.

To achieve these functions, ANNs need to be trained. In very general terms, training means determining the weights applied to the inputs of each neuron. In general, training is achieved by using a training data set in which the input and the desired output is known; this is called supervised training with a labelled data set (see below). The weights between the neurons of the ANN are changed such that the input is converted to the desired output as closely as possible. The weights may be optimised by minimising an error function (for example via error backpropagation).

A verification data set, which also includes inputs with desired outputs, may be used to verify and check the performance of the ANN. The verification data set is not used in training the ANN (i.e. determining the weights of the ANN). In other words, the verification data set is different from the training data set.

Producing the training and verification datasets usually requires "labelling" of the data set. That means that it has been determined that the output is what is desired from the corresponding input. Labelling may be time consuming.

For an FNN as described above, each input vector to the input layer is considered independently from each other input vector to the input layer. Consequently, each output vector from the output layer is independent from each other output vector.

Recurrent neural networks (RNNs) are a category of ANN in which temporal relationships between input vectors can be exploited. This is achieved by including feedback between a first operating cycle (during which a first input vector is processed to form a first output vector) and a second subsequent operating cycle (during which a second input vector is processed to form a second output vector) in the processing by an RNN.

Two example ways of implementing such a feedback connection are described. The first is that at least one of the neurons in the RNN takes (either directly or indirectly) as an input at least one output of a neuron in the same or subsequent layer. The output used could be from the same neuron during a previous operating cycle. The second is that the activation function in a particular neuron is a function of time. In particular, the activation function may be at least partially defined by a preceding cycle. In both cases, feedback between operating cycles may be enabled.

The feedback allows the output of a particular neuron to depend on data that has preceded at an earlier time step and not only the values coming from the preceding layer. Thus, an RNN is able to use relationships between input vectors. Where the input vectors are sequential in time, then the RNN is able to use temporal relationships between input vectors to improve performance. In general for an RNN, the inputs/weights and/or activation functions of the hidden layer(s) in a second cycle are dependent on the inputs/weights and/or activation functions of the hidden layer(s) in a first, preceding cycle. An RNN may implement multiple feedback connections having different memory timescales. The RNN exhibits a memory of at least one preceding cycle. The RNN may exhibit a memory of a plurality of preceding cycles.

Figure 4:
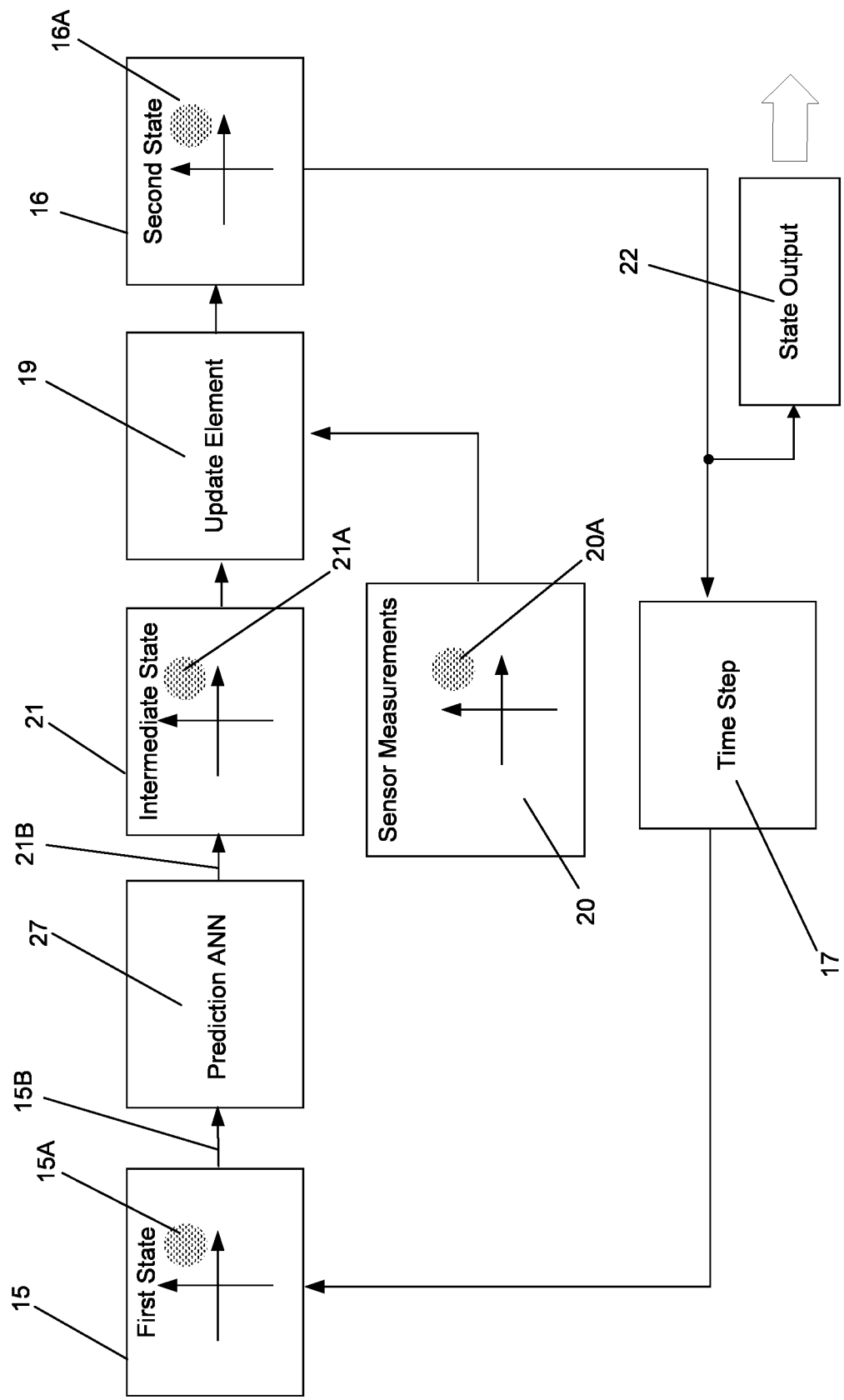
FIG. 4 is a block diagram illustrating a state estimator in accordance with a first embodiment.

FIG. 4 illustrates a first embodiment of a state estimator according to the present invention. Elements common to the embodiment of FIG. 4 and the state estimator of FIG. 2 use the same element reference numerals. In the embodiment of FIG. 4, a prediction model of the prediction element includes a prediction ANN 27.

Figure 5:
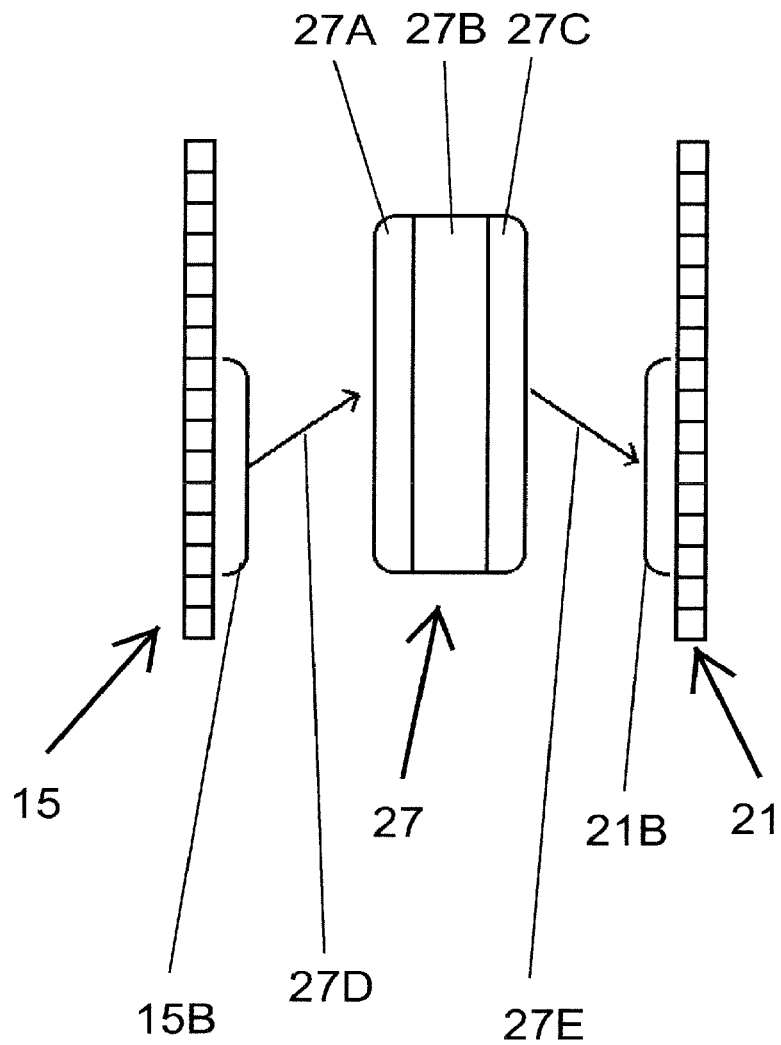
FIG. 5 illustrates the ANN of FIG. 4.

In FIG. 5 the prediction ANN 27 is shown having an input layer 27A, an output layer 27C, and at least one hidden layer 27B therebetween (see FIG. 3).

FIG. 5 also illustrates the first state 15 as a vector of values and the estimated second state 21 as a vector of values. Each value in the first state vector corresponds to an attribute contained in the first state 15. Each value in the estimated second state vector corresponds to an attribute contained in the estimated second state 21. The intermediate state corresponds to the estimated second state.

The input layer 27A of the prediction ANN 27 uses an input vector 27D. The input vector 27D includes a set of input values 15B from the first state 15. The input values 15B may be a selection of the values in the first state, or the input values 15B may include all of the values in the first state 15. In any case, each respective value in the input vector 27D may form an input for a respective input neuron of the input layer 27A of the prediction ANN 27.

The input vector 27D is processed through the prediction ANN 27 to form an output vector 27E from the output neurons of the output layer 27C of the prediction ANN 27. The output vector 27E is a set of output values 21B in the estimated second state 21. The output values 21B may correspond to the same parameters in the estimated second state 21 as the input vector 27D does to the input state 15.

The prediction ANN 27 may predict the trajectory through state space of the set of input values 15B in order to form the set of output values 21B.

Before the prediction ANN 27 is able to do so, the prediction ANN 27 may be trained on labelled training data. The labelled training data may include "ground truth". That is, the desired output from the prediction ANN 27 is known. Training may require the assumption that the sensor measurements 20 do not improve the second state.

The prediction ANN 27 can reproduce non-linear relationships between the set of input values 15B and the set of output values 21B. By using the prediction ANN 27, the behaviour that the prediction element 18 is capable of predicting is not limited by analytic linear prediction models.

The prediction element 18 may include more than one prediction ANN 27. Each respective prediction ANN 27 may correspond to a respective prediction model. Each ANN may have a different set of input values 15B selected from the first state 15, as compared with the input values selected from the first state 15 for each other prediction ANN 27 in the prediction element 18. The input vector 27D for one prediction ANN 27 may include some values from the first state that are also comprised in the input vector 27D of another prediction ANN 27. Equations realized by any of the ANNs may take into account a class attribute of the internal object.

There may be different prediction ANNs, each corresponding to a different part of the state. There may also be interconnections (and thus dependencies) between the different prediction ANNs. Alternatively, a single ANN may form the prediction ANN for the whole state.

Figure 6:
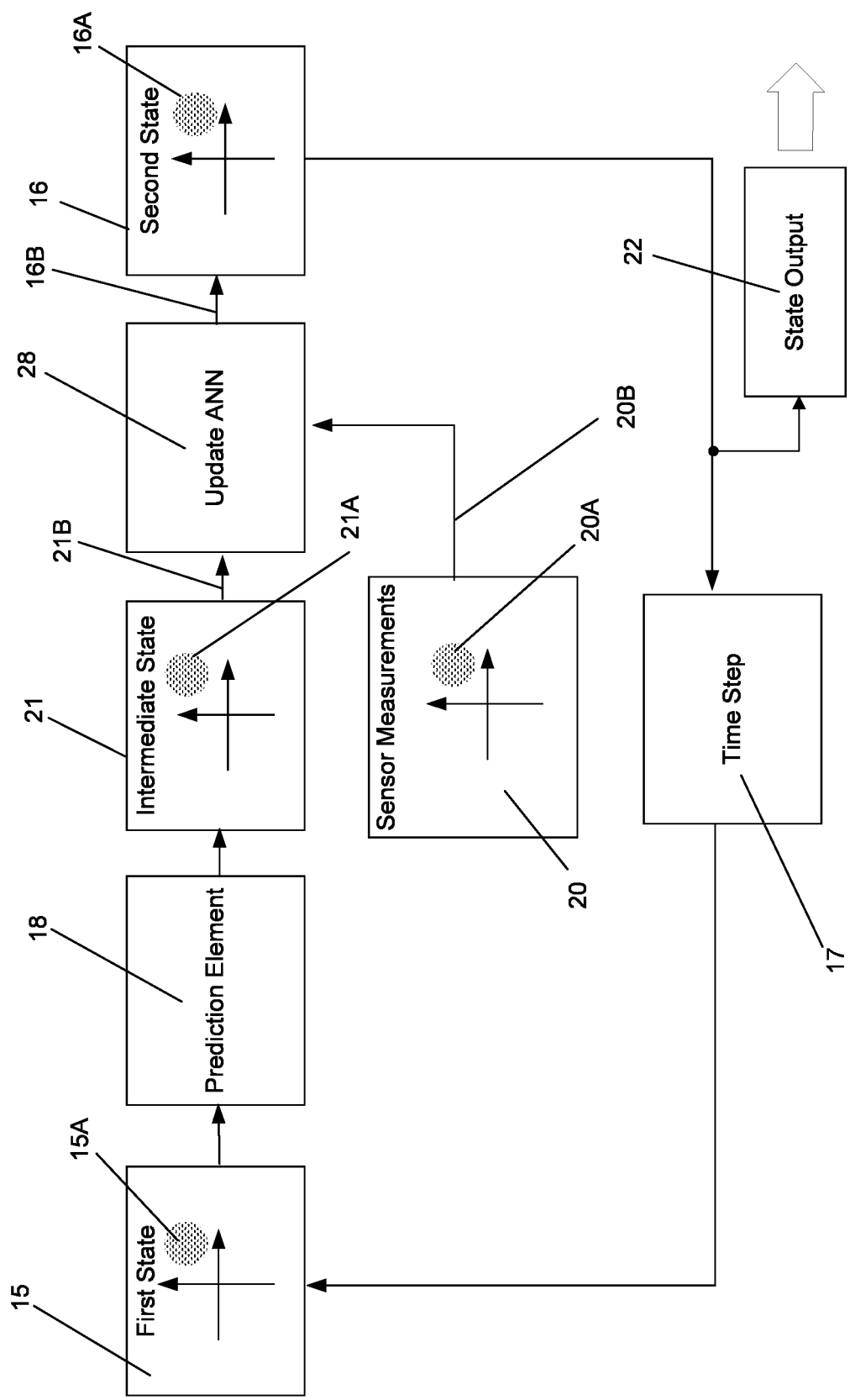
FIG. 6 is a block diagram illustrating a state estimator in accordance with a second embodiment.

FIG. 6 illustrates a second embodiment of a state estimator according to the present invention. Elements common to the embodiment of FIG. 6 and the state estimator of FIG. 2 use the same element reference numerals. In the embodiment of FIG. 6, an update model of the update element includes an update ANN 28.

Figure 7:
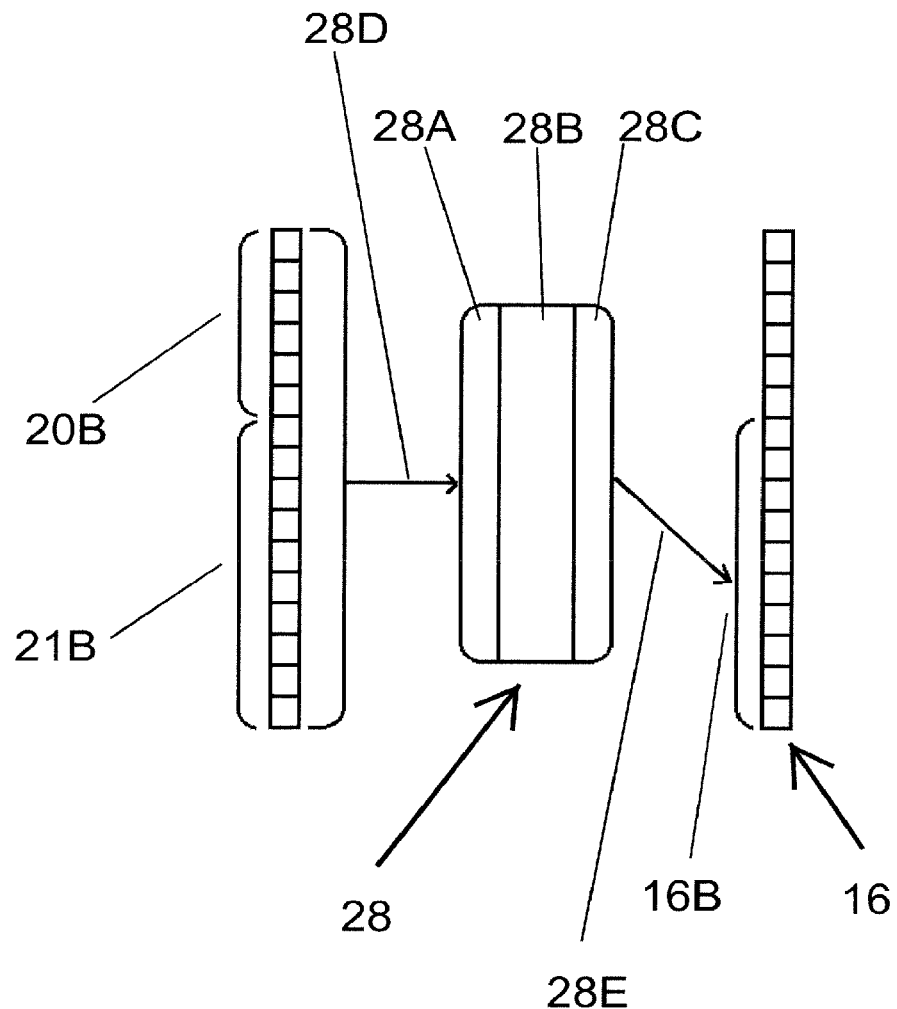
FIG. 7 illustrates the ANN of FIG. 6.

In FIG. 7, the update ANN 28 is shown having an input layer 28A, an output layer 28C, and at least one hidden layer 28B therebetween (see FIG. 3).

FIG. 7 also illustrates the measurements 20B as a vector of values and at least part of the estimated second state 21B as a vector of values. It may also be that the update ANN 28 uses the whole of the estimated second state 21B as an input. In this case, some of the weights in the update ANN 28 may become zero during the training process. This may be the case where the measurements from a sensor have no effect on a particular aspect of the second state, for example.

Each value in the measurements vector 20B corresponds to at least one measured attribute from at least one sensor. The attribute may be a direct measurement, or the parameter may be a calculated value from measurements that is sent from the sensor to the ECU. Each value in the estimated state vector 21B corresponds to an attribute contained in the estimated state 21.

Together the measurements 20B and the estimated second state (or a part of it) 21B form an input vector 28D to the update ANN 28. The update ANN 28 effectively incorporates the measurements vector 20B into the estimated second state vector 21B to form an output vector 28E. The output vector 28E a set of output values 16B in the second state 16. The update ANN 28 therefore refines the estimated second state using the measurements to form the second state.

Before the update ANN 28 is able to do so, the update ANN 28 may be trained using labelled training data. The labelled training data may include "ground truth". That is, the desired output from the update ANN 28 is known.

In general, an update ANN should correct everything that was incorrectly estimated by the prediction model. In other words, the update ANN should use sensor measurements to correct for prediction model inaccuracies.

For example, a traffic object may, according to the prediction model, continue travelling along a straight path. If, in fact, the object actually travels along a non-straight path, then the location of the object according to the estimated second state will be incorrect. The update model uses sensor measurements to refine the estimated second state so that it more accurately reflects the actual position of the traffic object in the second state.

Thus, for training of the update ANN, it may be that the prediction step used in the final model is used. For example, a way to achieve this would be to use ground-truth state vector from step k-1 and then run a (classical) prediction model. The classical prediction is the input to update ANN. The expected output is the ground-truth x from step k. The update ANN is trained on the basis of such known inputs and outputs.

In such a training scheme, P may either be omitted from the algorithm, or approximate values will be used. The approximate values may be derived from running a classical Kalman filter in parallel (only during training).

The update ANN 28 can reproduce non-linear relationships between its two inputs and the estimated second state. An advantage of the update ANN is that no mathematical sensor model is required, or needs to be known.

The update element 19 may include more than one update ANN 28. Each sensor or sensor system that provides measurements of the state may have a separate update ANN 28 for incorporating those measurements into the estimated second state. This provides for a flexible system because different sensors and sensor systems may provide measurements at different rates or at different times, and thus, a particular update ANN 28 corresponding to a particular sensor may only be used when there are available measurements from that sensor to incorporate into the state.

Figure 8:
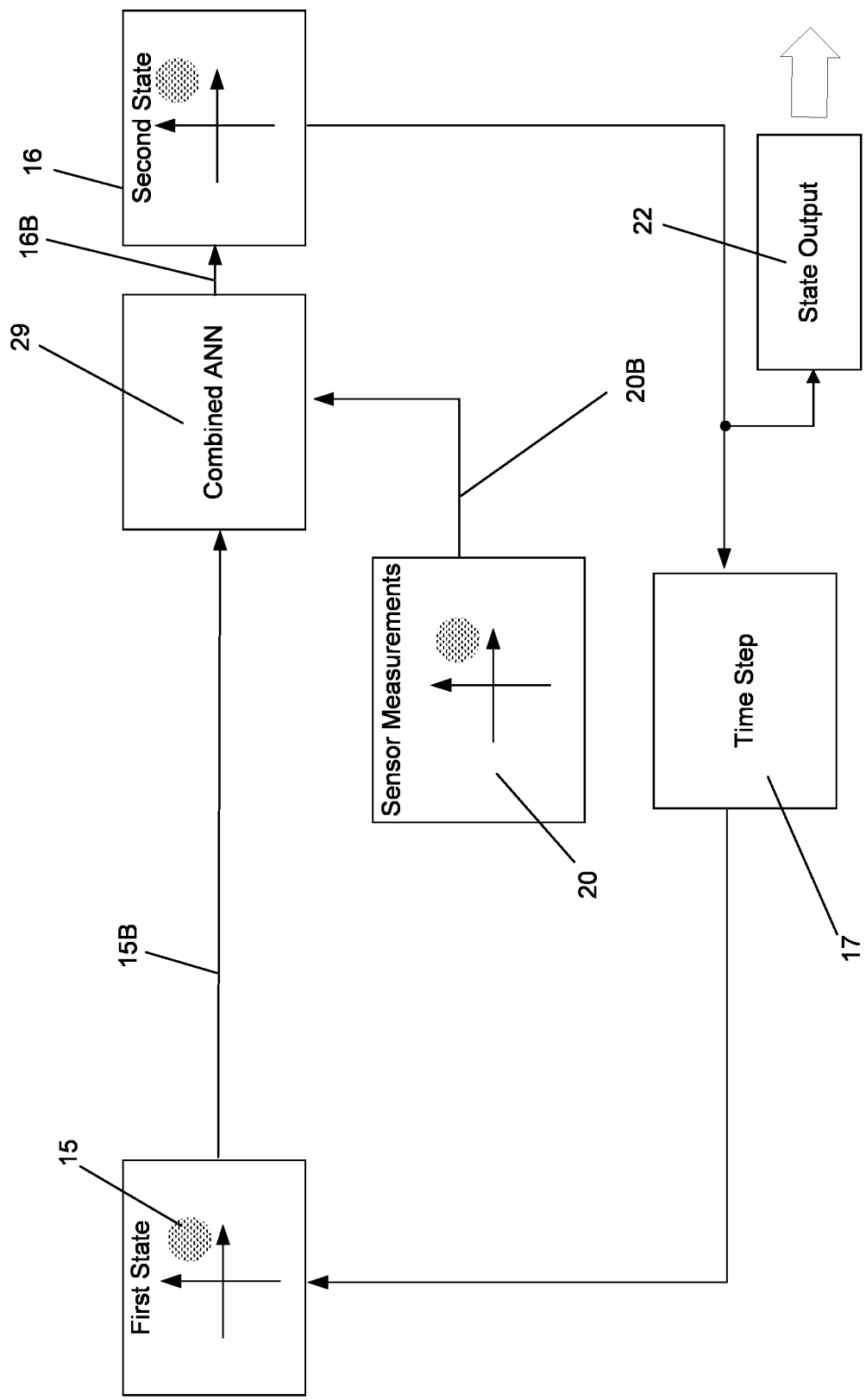
FIG. 8 is a block diagram illustrating a state estimator in accordance with a third embodiment.

FIG. 8 illustrates a third embodiment of the present invention. In the embodiment of FIG. 8, a single combined prediction and update ANN (a "combined ANN") 29 is provided. The combined ANN 29 performs the function of both the prediction ANN 27 of the first embodiment and the update ANN 28 of the second embodiment.

Figure 9:
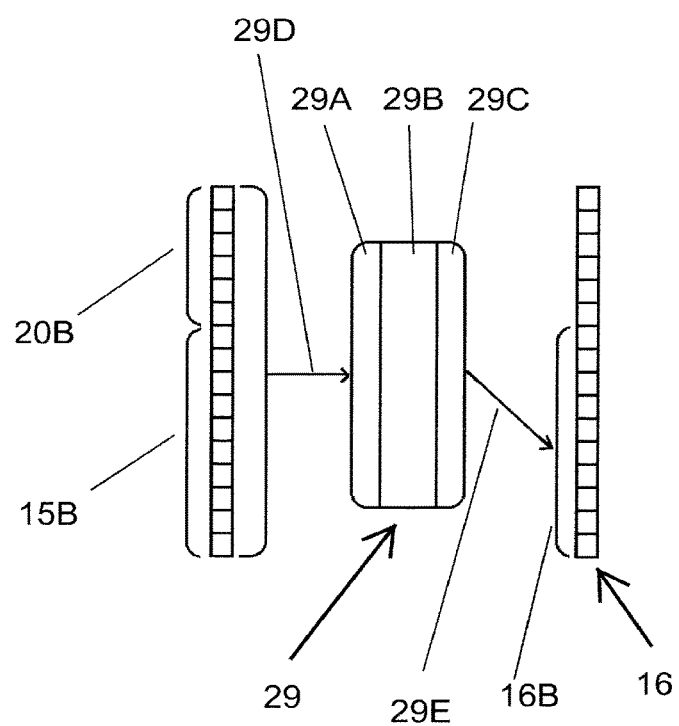
FIG. 9 illustrates the ANN of FIG. 8.

In FIG. 9, the combined ANN 29 is shown having an input layer 29A, an output layer 29C, and at least one hidden layer 29B therebetween (see FIG. 3).

FIG. 9 also illustrates the measurements 20B as a vector of values and at least part of the first state 15B as a vector of values. Each value in the measurements vector 20B corresponds to a measured parameter from a sensor. The parameter may be a direct measurement, or the parameter may be a calculated value from measurements that are sent from the sensor the ECU. Each value in the first state vector 15B corresponds to an attribute contained in the first state 15.

Together the measurements vector 20B and the first state vector 15B form an input vector 29D to the combined ANN 29. The combined ANN 29 effectively incorporates the measurements vector 20B and the first state vector 15B to form an output vector 29E. The combined ANN 29 effectively predicts the trajectory of the first state vector 15B through state space and incorporates the measurements vector 20B into the first state vector 15B to form the output vector 29E. The output vector 29E includes a set of output values 16B in the second state 16. It will be appreciated that there are no distinct second state estimation and refinement steps with the combined ANN. Instead, both steps are effectively implemented indistinguishably by the combined ANN. In other words, the combined ANN 29 performs the function of both the prediction ANN 27 of the first embodiment and the update ANN 28 of the second embodiment.

To train the combined ANN, for example, the ground truth x from cycle k-1 may be used an input, with ground truth x from cycle k as a desired output. The combined ANN is trained on this basis, and derives its predictive and refine behaviour, on this basis.

In such a training scheme, P may either be omitted from the algorithm, or approximate values will be used. The approximate values may be derived from running a classical Kalman filter in parallel (only during training) and using the P(k−1) and P(k) values. In the first, second and third embodiments described above, the ANN may be an FNN, although other categories of ANN are also considered appropriate choices for the prediction ANN, the update ANN or the combined ANN of the first to third embodiments.

Figure 10:
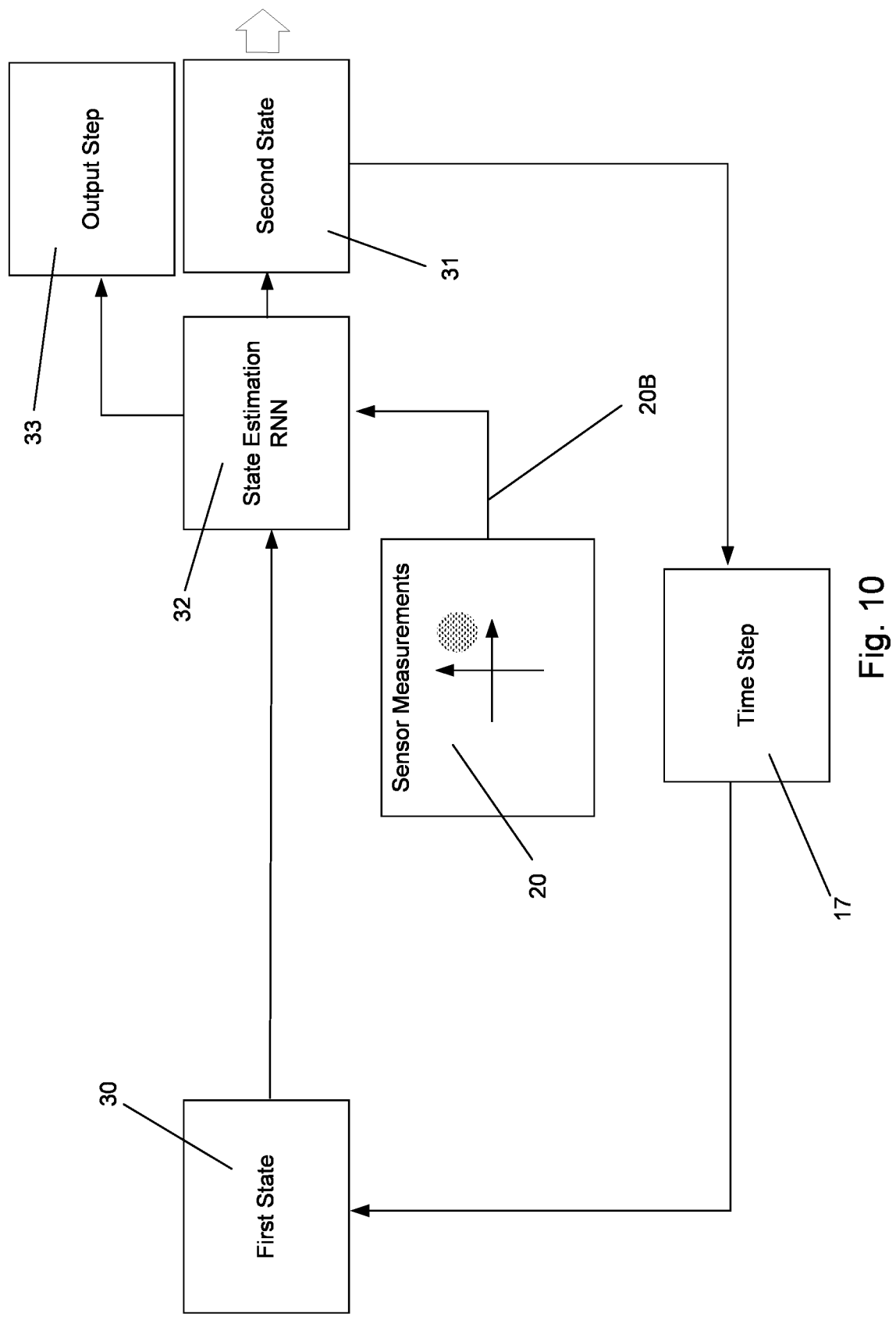
FIG. 10 is a block diagram illustrating a state estimator including a recurrent neural network ("RNN") in accordance with a fourth embodiment.

FIG. 10 shows a fourth embodiment of the present invention. FIG. 10 shows a first state 30 and a second, subsequent state 31. Each of the first state 30 and the second state 31 represent the state of the ego vehicle. A state estimation RNN 32 is illustrated. The state estimation RNN 32 estimates the second state 31 based on the first state 30 and sensor measurements 20. The state estimating is performed during each of a sequence of operating cycles. Each estimation of the second state 31 by the state estimation RNN 32 may be considered a single operating cycle.

In FIG. 10, the state estimation RNN 32 is represented as being connected to the first state 30 and the second state 31. The time step 17 between operating cycles is also represented. It will be appreciated that the separation of the first state from the state estimation RNN 32 and the second state from the state estimation RNN 32 is presented for clarity of explanation. The state estimation RNN 32 may be considered as including the first state 30, second state 31, and time step 17. The first and second state may not exist simultaneously the estimation of the second state from the first may be correspond to an updating and refinement of a persistent state within the state estimation RNN 32.

In the state estimation RNN 32, data is fed back in to the state estimation RNN 32 in a current operating cycle from at least one preceding operating cycle. The state estimation RNN 32 thus has a "memory" of at least one preceding operating cycle. This permits the state estimation RNN 32 to use temporal patterns in the inputs to the state estimation RNN 32. In the context of the present invention, this may allow the system to more accurately derive the second state by exploiting these temporal relationships in the data. Such behaviour is particularly useful in driver assistance system, where temporal relationships from one time step to the next are to be expected.

The state estimation RNN 32 effectively implements simultaneously, during one operating cycle, an estimation of a second state 31 from a first state 30 and a refinement of that estimated second state 31 on the basis of sensor measurements 20. It may be thought of that this process allows the state estimation RNN 32 to maintain a "persistent state" that corresponds to the current state of the ego vehicle. The state estimation RNN 32 implements a feedback mechanism, so that the state estimation RNN 32, during a current operating cycle, utilises information from at least one preceding operating cycle. Thus, the apparatus for the motor vehicle is able to use patterns in temporal sequences of input data when determining the second state (or maintaining the persistent state).

Figure 11:
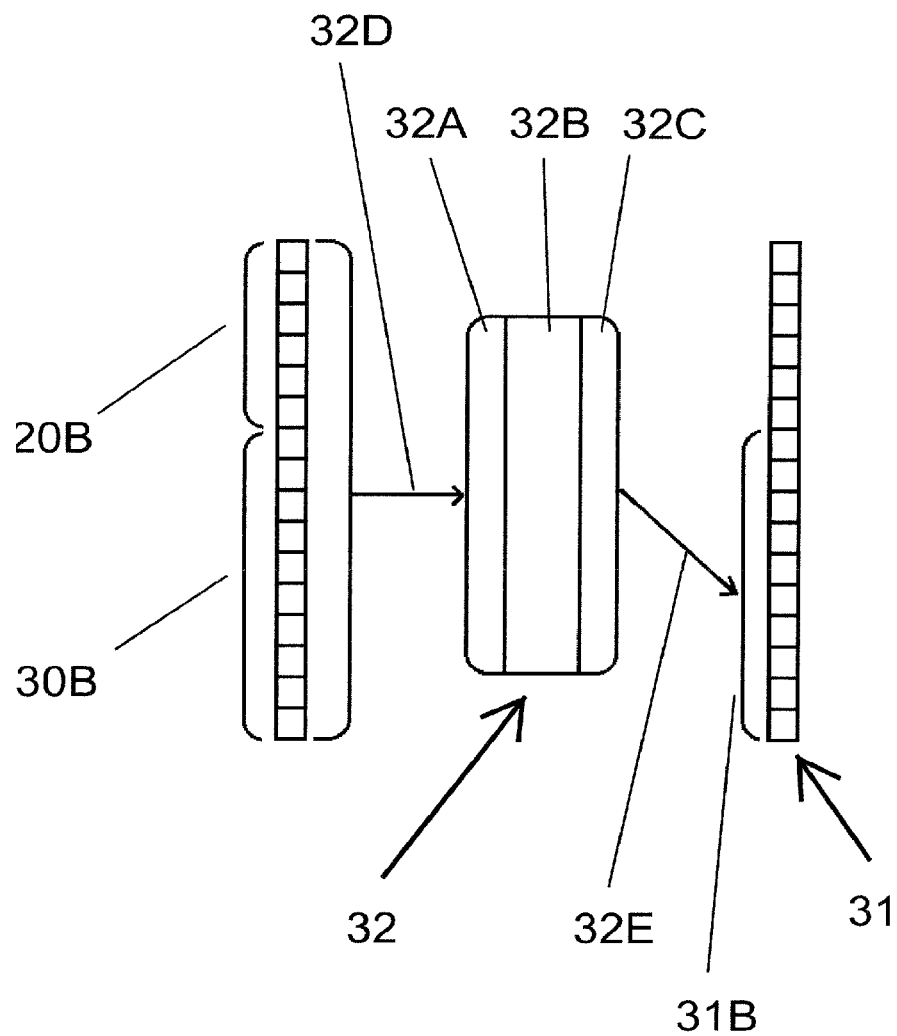
FIG. 11 illustrates the RNN of FIG. 10.

In FIG. 11, the state estimation RNN 32 is shown having an input layer 32A, an output layer 32C, and at least one hidden layer 32B therebetween. The state estimation RNN 32 is a recurrent neural network that has at least one feedback connection (as described above). The at least one feedback connection may be formed within the at least one hidden layer 32B. The feedback connection may include a memory for storing at least one parameter of the state estimation RNN 32 from a preceding cycle or a value that is dependent on at least one parameter of the state estimation RNN 32 from a preceding cycle. The at least one feedback connection means that the state estimation RNN 32 has a memory of at least one preceding cycle to the state estimation RNN 32. The state estimation RNN 32 may be configured to have a plurality of feedback connections corresponding to respective historical preceding operating cycles. For example, the state estimation RNN 34 may be configured to have a memory of five preceding operating cycles. The plurality of preceding operating cycles used by the feedback connections may be the plurality of preceding operating cycles immediately preceding the current operating cycle.

FIG. 11 also illustrates the measurements 20B as a vector of values and at least part of the first state 30B as a vector of values. Each value in the measurements vector 20B corresponds to a measured parameter from a sensor. The parameter may be a direct measurement, or the parameter may be a calculated value from measurements that are sent from the sensor to the ECU. Each value in the first state vector 30B corresponds to a parameter contained in the first state 30.

Together the measurements vector 20B and the first state vector 30B form an input vector 32D to the state estimation RNN 32. The state estimation RNN 32 effectively incorporates the measurements vector 20B into the first state vector 30B to form an output vector 32E. The state estimation RNN 32 effectively predicts the trajectory of the first state vector 30B through state space and incorporates the measurements vector 20B into the first state vector 30B to form the output vector 32E. The output vector 32E includes a set of output values 31B in the second state 31.

The first to third embodiments may use an x, P tuple to represent a particular ego vehicle state. Wherein, the x values may be real world parameters, for example, ego vehicle location, ego vehicle velocity, local objects and their respective locations and velocities, for examples.

Using the fourth embodiment however, whilst it may be possible to use an x, P tuple for the state, it may also be that the state estimation RNN 32 abstracts the representation of the state (i.e. the first state 30 and the second state 31) away from an x, P tuple into a different, abstracted state space, which may bear no relation to the x, P tuple (it may be entirely impossible to distinguish x values from P values, for example). The abstracted state space may be formed automatically in the process of training the state estimation RNN 32. The abstracted state space may be more efficient in the sense that the same quantity of information as found in a particular x, P tuple may be represented in a more compact and/or accurate form by representation in the abstracted state space formed by the state estimation RNN 32. Using the state estimation RNN 32 may be advantageous because it could reduce compute complexity and required storage capacity. This is particularly useful for ego vehicle driver assistance systems, where compute capacity may be limited. A trade-off between accuracy and memory requirements may be made which depends on, for example, the number of feedback connections. The state estimation RNN 32 may arrive at the optimal representation given the bandwidth assigned to the feedback connections, i.e. the amount of persistent memory provided for feedback.

Because of this abstract state representation by the state estimation RNN 32, an output step for deriving at least one real world attribute from the state estimation RNN for use by the driver assistance system is provided. The output step 33 may include an output ANN. The output ANN is trained to derive from the state estimation RNN 32, real world attributes for use by the driver assistance system.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

While the above description constitutes the preferred embodiment of the present invention, it will be appreciated that the invention is susceptible to modification, variation and change without departing from the proper scope and fair meaning of the accompanying claims.

The invention claimed is:

1. An apparatus for a motor vehicle driver assistance system for an ego vehicle, the apparatus comprising:
   one or more sensors; and
   an electronic control unit configured to implement a state estimator configured to use a first state of the ego vehicle to calculate a second state of the ego vehicle by using:
      a prediction model to estimate the second state from the first state; and
      an update model to refine the estimated second state on the basis of at least one value corresponding to a measurement of the second state, the at least one value being determined from at least one sensor measurement from the one or more sensors;
   wherein to calculate the second state from the first state the electronic control unit is configured to use an artificial neural network ("ANN"); and
   wherein the update model is an update ANN, and wherein an input vector to the update ANN comprises at least a portion of the estimated second state and the at least one value corresponding to the measurement of the second state, and an output vector of the update ANN is at least a portion of the second state, and wherein the update ANN is configured to correct one or more inaccuracies of the estimated second state produced by the prediction model.

2. An apparatus according to claim 1, wherein the prediction model is a prediction ANN.

3. An apparatus according to claim 2, wherein an input vector to the prediction ANN comprises at least a portion of the first state, and an output vector of the prediction model ANN is at least a portion of the estimated second state.

4. An apparatus according to claim 1, wherein the update model and the prediction model are combined into a combined ANN, an input vector to the combined ANN comprises at least a portion of the first state and the at least one value determined from the at least one sensor measurement, and an output vector of the combined ANN forms at least a portion of the second state.

5. An apparatus according to claim 1, wherein the first state and the second state each include at least one ego vehicle attribute describing an aspect of a motion of the ego vehicle.

6. An apparatus according to claim 1, wherein the first state and the second state each include at least one local object attribute describing a local object located in the vicinity of the ego vehicle.

7. An apparatus according to claim 6, wherein the at least one local object attribute includes a location of the local object.

8. An apparatus according to claim 7, wherein the ANN is configured to estimate a second location of the local object in the estimated second state using a first location of the local object in the first state.

9. An apparatus according to claim 6, wherein the local object is a local vehicle.

10. An apparatus according to claim 9, wherein the at least one value corresponding to the measurement of the second state includes a measurement of the second location of the local vehicle.

11. An apparatus according to claim 1, wherein the apparatus is configured to output an output variable from the second state for use by an active driver assistance device or a passive driver assistance device.

12. An apparatus according to claim 1, wherein the apparatus is configured to output an output variable from the second state for presentation to a driver of the ego vehicle.

13. An apparatus according to claim 1, wherein the first state and the second state each include at least one environment attribute describing an environment in which the ego vehicle is located.

14. An apparatus according to claim 1, wherein the update ANN includes a first neuron, in a first layer of the ANN, configured to use as an input at least one output of a second neuron, the first layer of the ANN, as the first neuron or a second layer of the ANN that is subsequent to the first layer of the ANN.

15. A method for estimating a state of an ego vehicle, the state being for use in a motor vehicle driver assistance system for the ego vehicle, the method comprising:
   making at least one sensor measurement using one or more sensors of the ego vehicle; and
   calculating a second state of the ego vehicle from a first a first state of the ego vehicle using a state estimator by:
      using a prediction model to estimate the second state from the first state; and
      using an update model to refine the estimated second state on the basis of at least one value corresponding to a measurement of the second state, the at least one value being determined from the at least one sensor measurement;
   wherein calculating the second state from the first state includes using an artificial neural network ("ANN"); and
wherein the update model is an update ANN, and wherein an input vector to the update ANN is formed from at least a portion of the estimated second state and the at least one value corresponding to the measurement of the second state, and an output vector of the update ANN is at least a portion of the second state, and wherein the update ANN is configured to correct one or more inaccuracies of the estimated second state produced by the prediction model.

\* \* \* \* \*